Oct. 16, 1934.  E. S. HINELINE  1,977,569
FILM MAGAZINE
Filed May 5, 1933  2 Sheets-Sheet 1
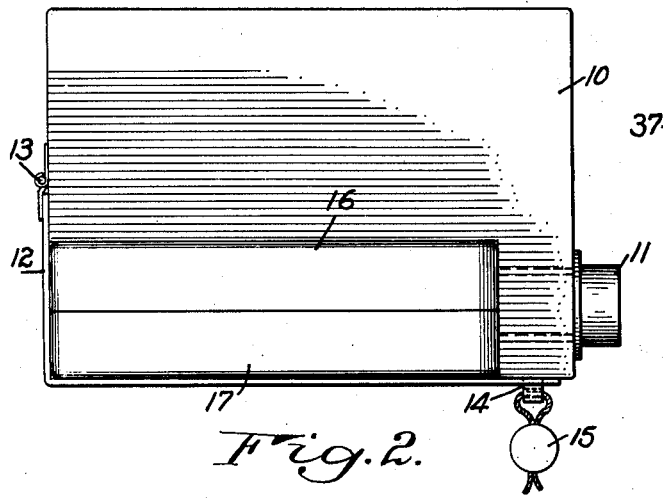
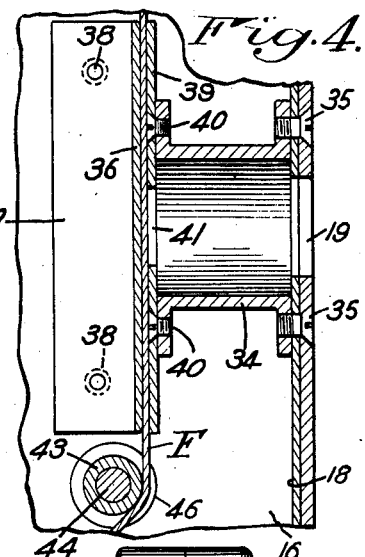
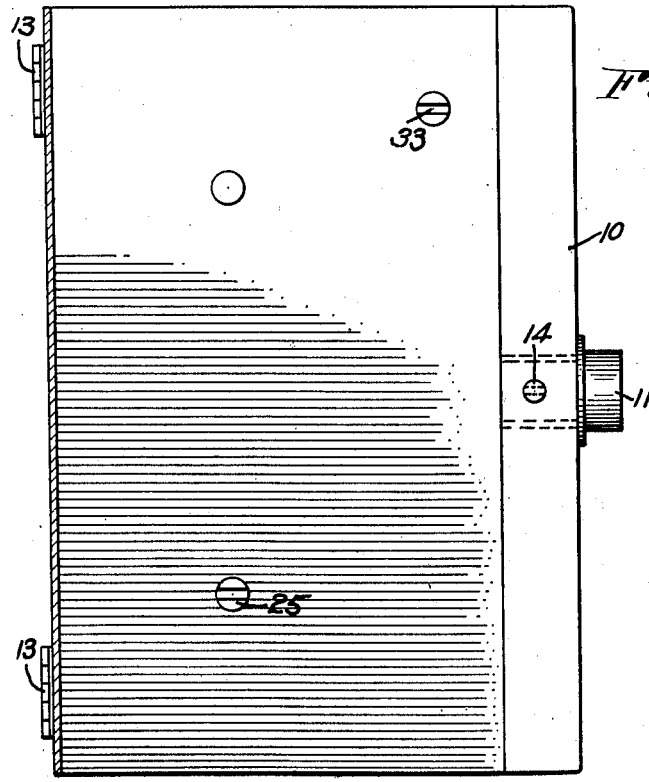
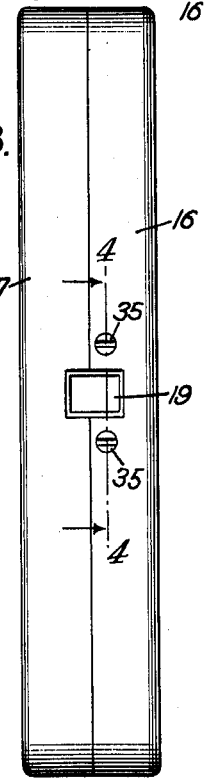

Oct. 16, 1934.  E. S. HINELINE  1,977,569
FILM MAGAZINE
Filed May 5, 1933  2 Sheets-Sheet 2
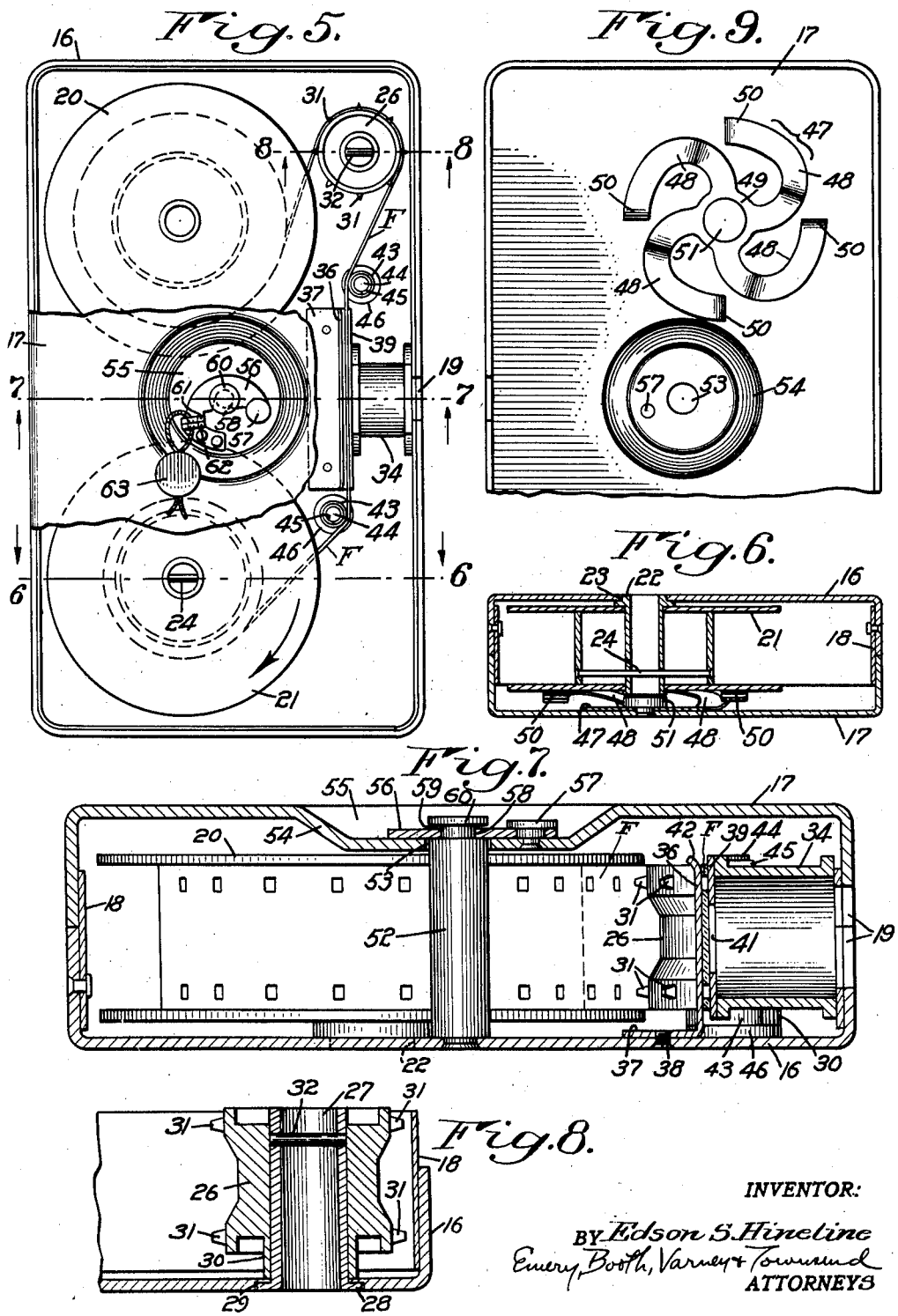

Patented Oct. 16, 1934

1,977,569

UNITED STATES PATENT OFFICE 1,977,569

FILM MAGAZINE

Edson S. Hineline, Rochester, N. Y., assignor to Folmer Graflex Corporation, Rochester, N. Y., a corporation of Delaware Application May 5, 1933, Serial No. 669,508

10 Claims. (Cl. 88—17)

My present invention relates to film packages or magazines, and more particularly aims to provide such package or magazine of said class which may be sealed against tampering. One embodiment of the invention is disclosed, by way of example, in the copending application of myself and one William H. Petit Serial No. 653,426, filed January 25, 1933, and is there claimed in combination with certain photographic apparatus. The film package or magazine per se is the sole invention of myself, the claims to such film package or magazine per se being contained in the present application.

In the drawings, illustrating, by way of example, one embodiment of the invention, Fig. 1 is a plan view of a photographic apparatus or camera embodying my invention, including a film magazine sealed in position for operation;

Fig. 2 is a side elevation of the apparatus of Fig. 1 but with the magazine removed to show the film feed and take-up drives;

Fig. 3 is an end view of the magazine of Fig. 1, showing the exposure aperture;

Fig. 4 is a section, upon a larger scale, on the line 4—4 of Fig. 3, showing the film guide, exposure aperture and light tube;

Fig. 5 is a side view of the magazine of Figs. 1 and 3, with portions of the cover broken away to show the internal parts;

Fig. 6 is a section on the line 6—6 of Fig. 5, through the take-up reel, looking in the direction of the arrows;

Fig. 7 is a section, upon the enlarged scale of Fig. 4, on the line 7—7 of Fig. 5, looking in the direction of the arrows;

Fig. 8, on the scale of Figs. 4 and 7, is a section on the line 8—8 of Fig. 5, through the intermittent feed or drive wheel; and Fig. 9 is an inside view of a portion of the cover including one of the brake devices for the film reels.

The film package or magazine of my present invention, adapted for sealing against tampering by unauthorized persons, is capable of use in many different relations, and with photographic apparatus of various sorts. For the purposes of illustration we have, in Figs. 1 and 2, represented a photographic apparatus or camera at 10, having an image or light admitting element 11. The camera desirably is equipped with a magazine door or other closure member 12, herein shown as hinged at 13, whereby the film magazine may be removably held in operative position with respect to the camera, to constitute therewith a photographic apparatus in light-communication. The camera and the magazine door or securing element 12 may be provided with means for fastening the latter in magazine-retaining position, as by means of one or more studs 14 on the camera each adapted to extend through a corresponding opening in the magazine door, and apertured for the reception of a retaining seal, such as shown at 15, Fig. 1.

The magazine or film package proper comprises a casing or receptacle shown as having two tray-like sections 16 and 17, oppositely disposed, and together forming a closed light-excluding container. One section, herein the bottom or holder section 16, has a peripheral lap strip 18 adapted for reception within the other section, herein the cover section 17, to position the two sections with respect to each other, and serving also to seal the joint between them, against the admission of light. At an appropriate position the magazine casing is provided with an exposure aperture 19, for cooperation with the light-admitting element of the photographic apparatus, said aperture being herein at approximately mid height of one narrow face, and being formed partly in each of the meeting walls of the two casing sections.

The film magazine or package is constructed and arranged to receive a supply of sensitized surface or film and to support the same in position for feeding. As illustrated, it accommodates a film roll, of the apertured positive-feed type of film, of the desired diameter for any particular photographic apparatus. Referring particularly to Fig. 5, we have there shown a film supply reel at 20 and a film take-up reel at 21. These reels, which may be of duplicate construction, are removably rotatably positioned within the magazine in any suitable manner, as by a short hub 22 at one of their faces, see Figs. 6 and 7, the adjacent flat face of the holder section 16 of the magazine having corresponding bearing apertures 23. The take-up reel 21, at the lower portion of Fig. 5, is provided with a coupling pin 24 for drivingly connecting it to the slotted end 25 of the shaft of the intermittent drive mechanism of the photographic apparatus; see Fig. 2.

The magazine as herein shown is equipped with a feed wheel or measuring roll 26, Figs. 5, 7 and 8, for intermittently moving the film strip from the supply reel and advancing it past the exposure aperture 19, toward the take-up reel. This feed wheel is rotatably mounted on the magazine at a convenient point adjacent the supply reel.

As shown in detail in Fig. 8 the feed wheel 26 comprises a tubular shaft 27 having a flanged head 28 seated in a countersunk recess 29 in the outer face of the magazine holder section 16. The wheel proper or drum portion is fitted onto the shaft 27, after the latter has been inserted through a bearing aperture in the magazine section 16 concentric with said recess 29. Said wheel 26 has at its lower portion, Fig. 8, a sleeve 30 adapted to abut the inner face of the casing, opposite said countersunk recess 29, thereby retaining the feed wheel in position axially. Circumferential series of spurs or points 31 are provided on the feed wheel, for engaging suitable marginal openings in the film F, to insure positive feeding of the latter. Intermittent or other drive for the feed wheel is accomplished through suitable driving connections, illustrated as a coupling pin 32 fitted diametrally into the hollow shaft 27 of the feed wheel and engageable with the slotted end of the feed wheel drive shaft 33 seen at the upper right portion of Fig. 2. It is thus seen that the film receptacle or magazine is equipped not only with means for supporting a sensitized film, in roll form, for feeding, but also with film feeding and take-up means, adapted for releasable driving association with a camera or photographic apparatus, whereby the magazine may be installed and exteriorly operated to feed the film but may itself remain continuously closed and sealed.

The film F coming from the supply reel 20 passes about the feed wheel 26, the spurs of the latter engaging in the film marginal openings, and thence past the exposure aperture 19. onto the take-up reel 21. As best seen in Fig. 4, and also in Figs. 5 and 7, the magazine is provided with a light tube 34 surrounding the exposure aperture 19 and held in fixed position in any suitable manner, as by the screws 35.

Film guiding means is provided opposite the exposure aperture, at the inner end of the light tube 34. Said means herein comprises an inner guide strip 36 secured on the magazine section 16 as by the foot 37 and screws 38, and a cooperating outer guide strip 39 mounted at the inner end of the light tube, as by the screws 40. Said guides are spaced to receive the film F between them and guide it in a straight path past the light tube. The outer guide 39 is provided with an exposure aperture 41, Figs. 4 and 7. Said guides are of such length and sufficiently close together as to exclude light from the interior of the magazine, other than directly onto the film at the back of the light tube. The inner guide preferably has a turned flange 42 at its free edge, see Fig. 7, to facilitate insertion of the film in loading the magazine.

The film F is preferably additionally guided, intermediate the feed wheel 26 and the exposure guides 36, 39, and also intermediate the latter and the take-up reel 21, by suitable roller guide means. Said guide means each comprises a rotary sleeve or roller 43 received on a post 44 mounted in the main wall of the magazine section 16 and held thereon as by a lock ring 45 received in a corresponding annular recess in the outer end of the post. At the base of each post 44 is a flange 46 adapted to engage the adjacent edge of the film and guide the latter transversely. One of said roller guides 43, at the entrance end of the main exposure guides 36, 39, is disposed with its periphery tangential to the plane of the film path through said exposure guides, at the right of said plane, as viewed in Fig. 5, while the other roller guide 43, at the exit end of the exposure guides, is similarly disposed at the opposite side of the film path, to conduct the film angularly onto the take-up reel 21.

The film magazine or package is desirably equipped with means for preventing overrunning or back lash of the film reels. One form of means for said purpose is illustrated in plan in Fig. 9, and in section in Fig. 6. It comprises a plural-point brake or friction element 47, in this instance integrally formed, of resilient sheet metal. Said element comprises a plurality of spring arms 48, four being illustrated, radiating from a central box 49 and having their outer portions reversely turned, in the general form of a reverse letter S, as viewed in Fig. 9. Said spring arms 48 project transversely, inwardly of the magazine from their base 49 and have their free ends bent back, outwardly of the magazine, providing friction areas 50 at their highest portions, adapted to engage and bear resiliently against the adjacent side face of the corresponding reel 20 or 21, see Fig. 6, whereby the reel is held against undesired turning movement. Each friction element is secured in position beneath a stud 51 passed through its base and fastened in the magazine cover 17, said stud serving as an end bearing for the hubs of the corresponding reel 20 or 21.

In accordance with the invention the magazine is provided with means whereby it may be secured in closed position, and sealed against opening, or tampering by any unauthorized person, without leaving evidence thereof. In the form illustrated, one of the magazine sections, herein the holder section 16, has a post 52, Fig. 7, fixedly mounted substantially centrally of the magazine, extending transversely and adapted, in the closed position of the parts, to project outwardly through a corresponding aperture 53 in the other section, herein the cover section 17. A portion of the latter, surrounding the aperture 53, is set in, as at 54, Figs. 6 and 9, providing a recess 55 at the outer face of the cover.

Within said recess is a securing member, shown as a latch 56 pivoted on the cover 16 as at 57 and having an arcuate notch 58 concentric with its pivot. The outer end of the securing post 52 has a peripheral groove 59, Fig. 7, for receiving the latch, as the latter is turned into locking position beneath the head 60 of the post. The notch portion 58 of the latch fits snugly about the reduced portion of the post, at the base of the groove 59 in the latter, so that it, and the post head, substantially completely seal the magazine against entry of light or dirt in the region of the magazine fastening means.

Means is additionally provided for retaining and sealing the latch in cover locking position. For this purpose the outer portion of the latch is upset, forming an ear, as at 61, adapted to abut a similar ear 62 formed on or secured to the cover 17, within the recess 55. Said ears are apertured, at aligned points, for the reception of a lock or seal such as illustrated at 63, Fig. 5. The ear 61 on the latch serves also as a finger piece for operating the latch. When the magazone has been loaded, closed and sealed, as by said seal 63, it may not be subsequently opened, for the purpose of tampering with the film, without leaving evidence of such tampering, inasmuch as the seal must first be broken. It will be noted that the cover locking means, including the latch 56 and related parts, as well as the seal 63 itself, are all adapted to lie within the recess 55 of the cover, so that there are no parts projecting beyond the plane of the cover, thus leaving the magazine or film package as a compact, flat-faced device of regular and symmetrical formation.

My invention is not limited to the particular embodiment thereof herein shown and described by way of example, its scope being set forth in the following claims:

1. A film package or magazine comprising opposed tray-like container sections together forming a closed light-excluding receptacle, externally operable film supporting, feeding and take-up means, a transversely extending member on one section, internally thereof, an indented portion on the other section and having a receiving formation therein for said transverse member, and a latch device cooperable with said transverse member and having all external parts confined within said indented portion.

2. A film package or magazine comprising opposed tray-like container sections together forming a closed light-excluding receptacle, externally operable film supporting, feeding and take-up means, a transversely extending member on one section, internally thereof, an indented portion on the other section and having a receiving formation therein for said transverse member, a latch device cooperable with said transverse member and having all external parts confined within said indented portion, and sealing means for said latch device also receivable within the confines of said indented portion.

3. A magazine for containing a photographic film placed therein in an unexposed condition and adapted, while wholly contained within said magazine, to be mechanically fed past an exposure opening of the said magazine, said magazine containing therein a light tube past the inner end of which the film is fed, whereby the film is at all times wholly contained within the magazine, said magazine comprising holder and cover sections together constituting a receptacle substantially rectangular throughout in both longitudinal and transverse cross sections, said receptacle containing film supporting, feeding and take-up means, one or more plane faces of said magazine having openings therein for the reception of film operating means carried by the camera, the external faces of said magazine being therefore without projecting operating parts, and means for securing said holder and cover sections in closed position.

4. A magazine for containing a photographic film placed therein in an unexposed condition and adapted, while wholly contained within said magazine, to be mechanically fed past an exposure opening of the said magazine, said magazine having an exposure aperture 19 and a light tube 34 surrounding said aperture and past the inner end of which tube the film is adapted to be fed, whereby the film is at all times wholly positioned within said magazine, said magazine comprising holder and cover sections together constituting a receptacle substantially rectangular throughout in both longitudinal and transverse cross sections, said receptacle containing film supporting, feeding and take-up means, one or more plane faces of said magazine having openings therein for the reception of film operating means carried by the camera, the external faces of said magazine being therefore without projecting operating parts, and means for securing said holder and cover sections in closed positions.

5. A magazine for containing a photographic film placed therein in an unexposed condition and adapted, while wholly contained within said magazine, to be mechanically fed past an exposure opening of the said magazine, said magazine containing therein a light tube past the inner end of which the film is fed, whereby the film is at all times wholly contained within the magazine, said magazine comprising holder and cover sections together constituting a receptacle substantially rectangular throughout in both longitudinal and transverse cross sections, said receptacle containing film supporting, feeding and take-up means, one or more plane faces of said magazine having openings therein for the reception of film operating means carried by the camera, the external faces of said magazine being therefore without projecting operating parts.

6. A magazine for containing a photographic film placed therein in an unexposed condition and adapted, while wholly contained within said magazine, to be mechanically fed past an exposure opening of the said magazine, said magazine containing therein a light tube past the inner end of which the film is fed, whereby the film is at all times wholly contained within the magazine, said magazine comprising holder and cover sections together constituting a receptacle, said receptacle containing film supporting, feeding and take-up means, one or more faces of said magazine having openings therein for the reception of film operating means carried by the camera, the external faces of said magazine being therefore without projecting operating parts, and means for securing said holder and cover sections in closed position.

7. A magazine for containing a photographic film placed therein in an unexposed condition and adapted, while wholly contained within said magazine, to be mechanically fed past an exposure opening of the said magazine, said magazine containing therein a light tube past the inner end of which the film is fed, whereby the film is at all times wholly contained within the magazine, said magazine comprising holder and cover sections together constituting a receptacle, said receptacle containing film supporting, feeding and take-up means, one or more faces of said magazine having one or more openings therein for the reception of film operating means carried by the camera, and means for securing said holder and cover sections in closed position.

8. A film package or magazine comprising opposed tray-like container sections together forming a closed, light-excluding receptacle, externally operable film supporting, feeding and take-up means, a transversely extending member on one section, internally thereof, and indented portion on the other section and having a receiving formation therein for said transverse member, and securing means cooperable with said transverse member and having all external parts confined within said indented portion.

9. A film package or magazine comprising opposed tray-like container sections together forming a closed, light-excluding receptacle, externally operable film-supporting, feeding and take-up means, a transversely extending member on one section internally thereof, an indented portion on the other section and having a receiving formation therein for said transverse member, securing means cooperable with said transverse member and having all external parts confined within said indented portion, and sealing means for said securing means also receivable within the confines of said indented portion.

10. A magazine for containing a photographic film placed therein in an unexposed condition and adapted, while wholly contained within said magazine, to be mechanically fed past an exposure opening of the said magazine, said magazine containing therein a light tube past the inner end of which the film is fed, whereby the film is at all times wholly contained within the magazine, said magazine comprising holder and cover sections together constituting a receptacle, said receptacle containing film supporting, feeding and take-up means, and film guiding means to guide the film in a substantially straight path past the inner part of the light tube, one or more faces of said magazine having one or more openings therein for the reception of film operating means carried by the camera, and means for securing said holder and cover sections in closed position.

EDSON S. HINELINE.